(12) United States Patent
Hall et al.

(10) Patent No.: US 7,467,884 B2
(45) Date of Patent: Dec. 23, 2008

(54) HOOD ASSEMBLY

(75) Inventors: Gregory S Hall, Woodinville, WA (US); Toby Steere, Bellevue, WA (US)

(73) Assignee: PACCAR Inc, Bellevue, WA (US)

( * ) Notice: Subject to any disclaimer, the term of this patent is extended or adjusted under 35 U.S.C. 154(b) by 384 days.

(21) Appl. No.: 11/087,367

(22) Filed: Mar. 22, 2005

(65) Prior Publication Data

US 2006/0214438 A1 Sep. 28, 2006

(51) Int. Cl.
*B60Q 1/068* (2006.01)

(52) U.S. Cl. ...................................... 362/496; 362/523

(58) Field of Classification Search ................. 362/496, 362/487, 523, 525, 531, 532; 280/727
See application file for complete search history.

(56) References Cited

U.S. PATENT DOCUMENTS

| | | | |
|---|---|---|---|
| 1,644,945 A | 10/1927 | Pattison | |
| 1,771,319 A | 7/1930 | Schmidt | |
| 2,584,576 A * | 2/1952 | Gould | 362/496 |
| 3,255,725 A * | 6/1966 | Von Kreidner et al. | 116/28 R |
| 3,278,741 A | 10/1966 | Wood | |
| 3,430,374 A * | 3/1969 | Woodard | 40/591 |
| 4,310,872 A * | 1/1982 | Lauve | 362/505 |
| 4,466,646 A | 8/1984 | Delmastro et al. | |
| 4,829,409 A * | 5/1989 | Funkey | 362/496 |
| 5,491,621 A * | 2/1996 | Duty | 362/397 |
| 2004/0160784 A1 | 8/2004 | Park | |

FOREIGN PATENT DOCUMENTS

FR 2576575 A3 8/1986

\* cited by examiner

*Primary Examiner*—Thomas M Sember
(74) *Attorney, Agent, or Firm*—Christensen O'Connor Johnson Kindness PLLC

(57) ABSTRACT

A hood assembly (100) adapted to be coupled to a vehicle having a hood (102) moveable between an open position and a closed position. The hood assembly includes a hood sub-frame (104) which includes a headlight mounting assembly (108) for permitting a left and right headlight (112 and 114) to be mounted to a left and right side of the hood sub-frame. The hood sub-frame also includes a hood mounting assembly (140 and 142) for coupling the hood sub-frame to the hood such that the hood sub-frame moves with the hood when the hood is coupled to the hood mounting assembly and moved between the open and closed positions. The hood sub-frame also has a cross brace assembly (144) passing between and coupled to the left side of the hood sub-frame and the right side of the hood sub-frame.

22 Claims, 5 Drawing Sheets

HOOD ASSEMBLY

FIELD OF THE INVENTION

The present invention relates generally to hood assemblies, and more particularly to hood assemblies for supporting a hood and a pair of headlights of the hood assembly.

BACKGROUND OF THE INVENTION

Previously developed hood assemblies for heavy-duty vehicles include a hood often made of a fiberglass or composite material. Attached directly to the hood is a pair of headlight assemblies, one coupled to a left side of the hood and another coupled to the right side of the hood. Inasmuch as the headlight assemblies are attached directly to and/or supported by the fiberglass material of the hood, which is somewhat flexible, the headlight assemblies tend to vibrate during use, decreasing their useful life and providing undesirable vibrating illumination of the area in front of the vehicle. Further, since the hood is made of a somewhat flexible material, the hood flexes and twists, which causes fatigue problems and further misalignment of the headlights coupled to the hood. Additionally, previously developed hood assemblies do not adequately protect a radiator of the vehicle during impact with an object, such as large wildlife. Thus, there exists a need for a new hood assembly that decreases headlight vibration, increases the rigidity of the hood, which moves with the hood, and/or which acts as a guard for the radiator of the vehicle.

SUMMARY OF THE INVENTION

One embodiment of a hood sub-frame formed in accordance with the present invention and adapted to be coupled to a vehicle having a hood moveable between an open position and a closed position is disclosed. The hood assembly includes a left headlight mounting assembly for permitting a headlight to be mounted to a left side of the hood sub-frame and a right headlight mounting assembly. The right headlight mounting assembly permits a headlight to be mounted to a right side of the hood sub-frame. The hood assembly also includes a hood mounting assembly for coupling the hood sub-frame to the hood such that the hood sub-frame moves with the hood when the hood is coupled to the hood mounting assembly and moved between the open and closed positions. The hood assembly also includes a cross brace assembly passing between and coupled to the left side of the hood sub-frame and the right side of the hood sub-frame.

Another embodiment of a hood assembly formed in accordance with the present invention for a vehicle having a hood is disclosed. The hood assembly includes a hood sub-frame comprising a left headlight mounting assembly, a right headlight mounting assembly, and a cross brace assembly passing between and coupling the left headlight mounting assembly to the right headlight mounting assembly. The hood sub-frame also includes a hood mounting assembly adapted to be coupled to the hood such that when the hood mounting assembly is coupled to the hood, the hood is at least partially supported by the hood mounting assembly and moves with the hood sub-frame. The hood assembly also includes a pivot assembly coupled to the hood sub-frame for angularly displacing the hood sub-frame and the hood when attached to the hood sub-frame between an open position and a closed position.

Still another embodiment of a hood assembly formed in accordance with the present invention adapted to be coupled to a vehicle having a radiator is disclosed. The hood assembly includes a hood and a hood sub-frame having a left headlight mounting assembly, a right headlight mounting assembly, and a cross brace assembly having a radiator protection member passing between and coupling the left headlight mounting assembly to the right headlight mounting assembly. The hood assembly also includes a hood mounting assembly coupled to the hood such that the hood moves with the hood sub-frame and a pivot assembly coupled to the hood sub-frame for angularly displacing the hood sub-frame and the hood between an open position and a closed position. When the hood assembly is coupled to the vehicle and the hood is in the closed position, the radiator protection member passes in front of the radiator.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
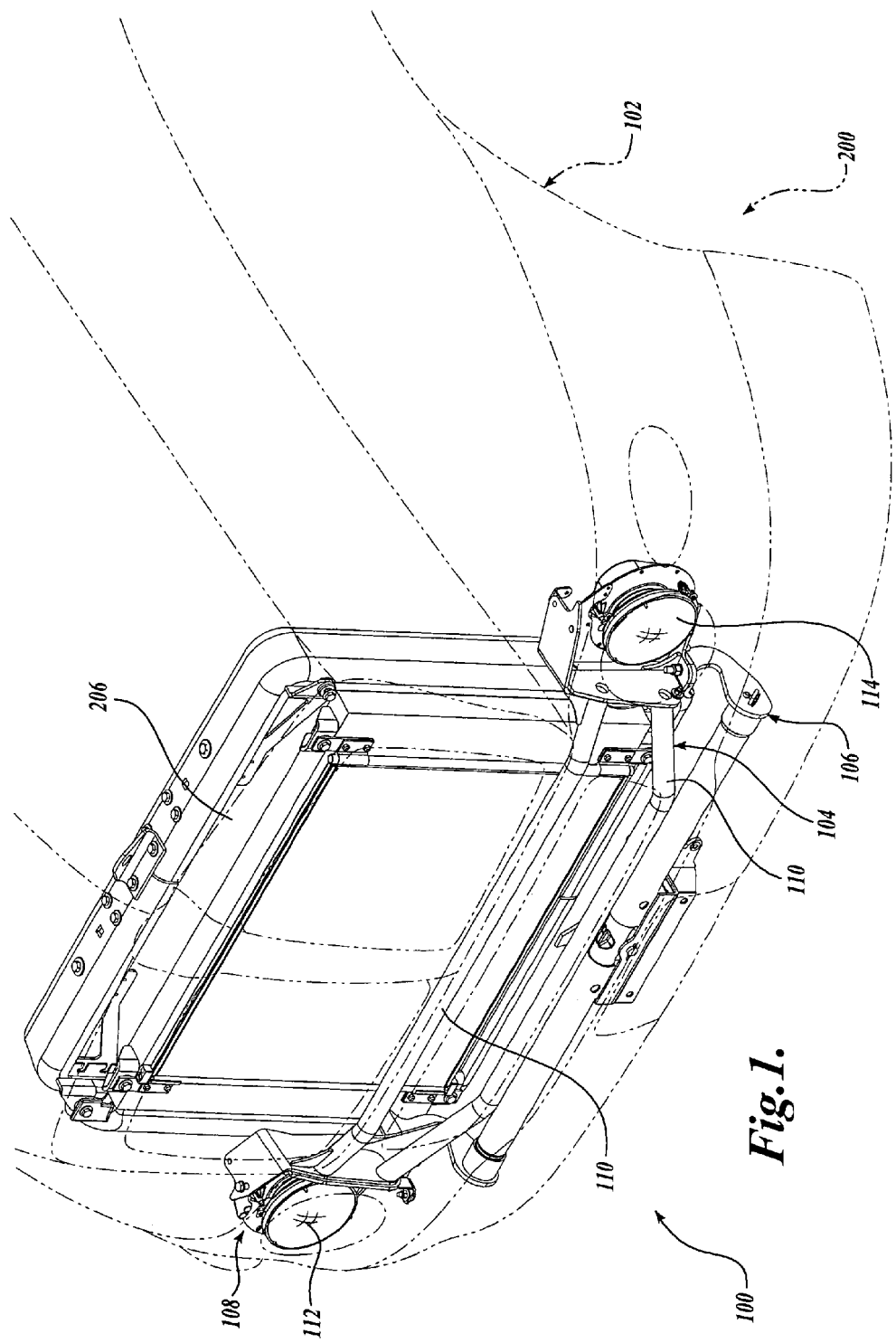
FIG. 1 is a perspective view of one embodiment of the hood assembly formed in accordance with the present invention, with a hood of the hood assembly shown in phantom to show the components of the hood assembly underlying the hood, such as a pivot assembly, a hood sub-frame, and a headlight assembly, and wherein a radiator of the vehicle is shown in solid lines to better show its spatial relationship to the components of the hood assembly.
Figure 2:
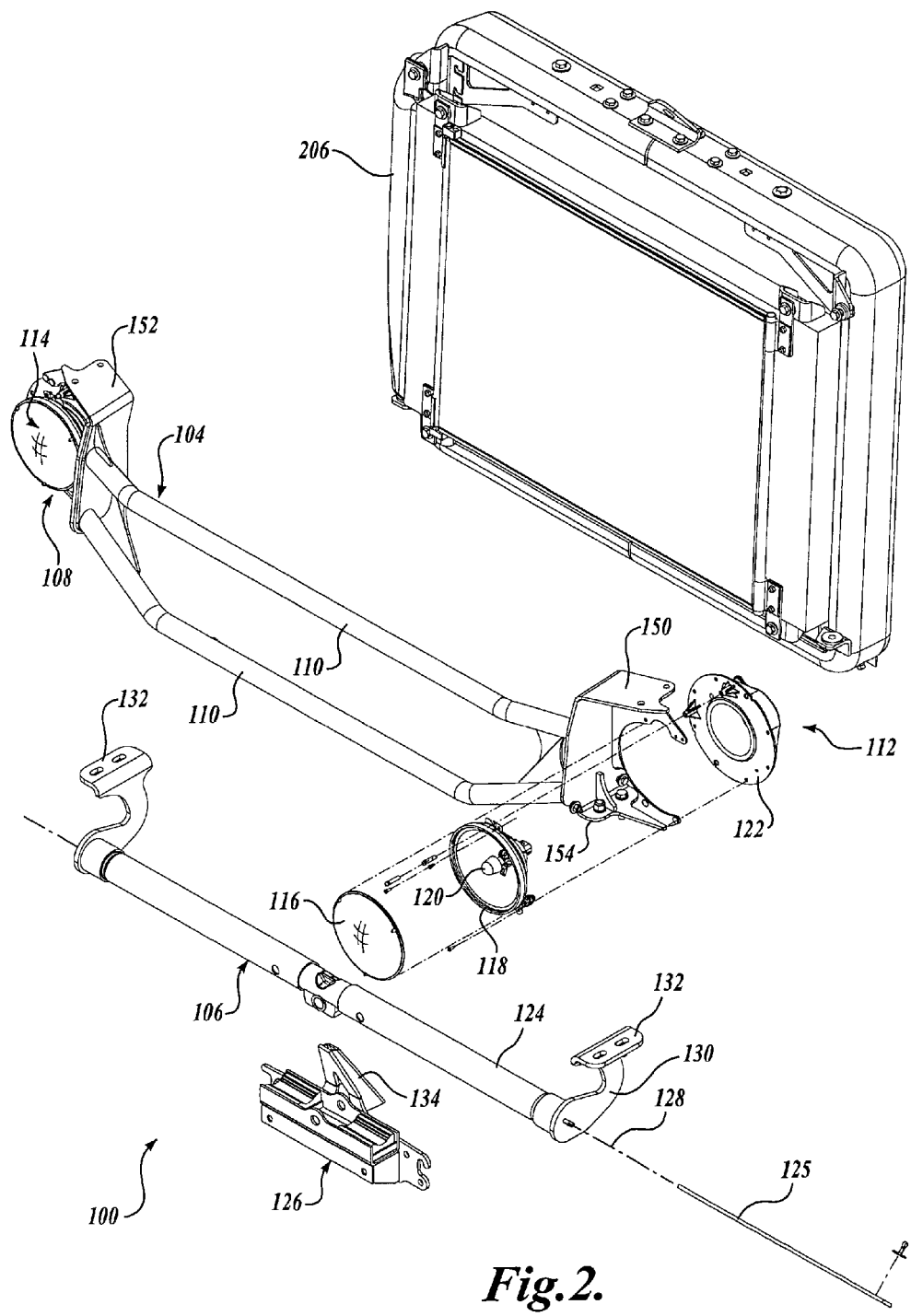
FIG. 2 is an exploded perspective view of the hood assembly and radiator of FIG. 1 with the hood removed for clarity.
Figure 3:
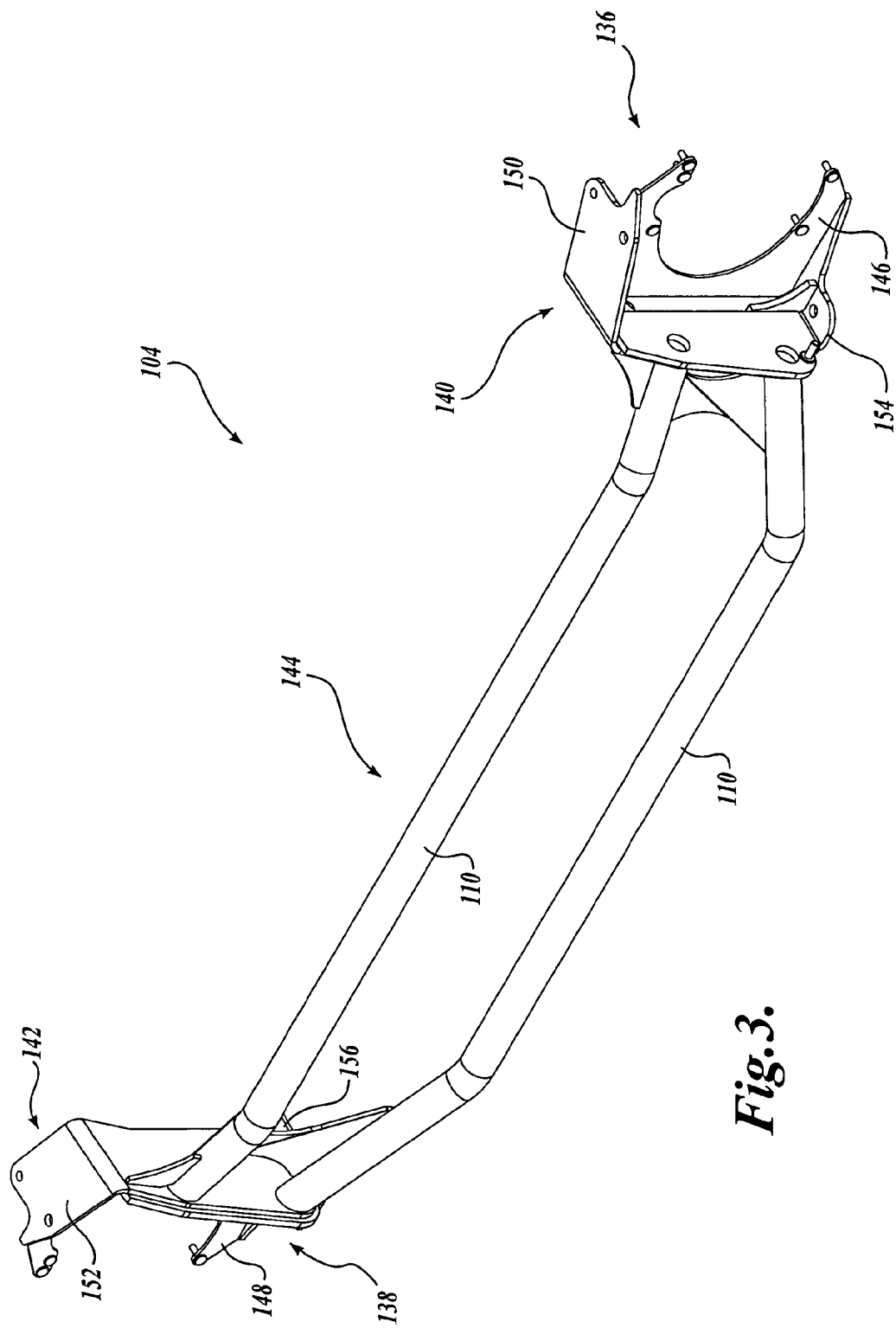
FIG. 3 is a perspective view of the hood sub-frame of FIG. 1.
Figure 4:
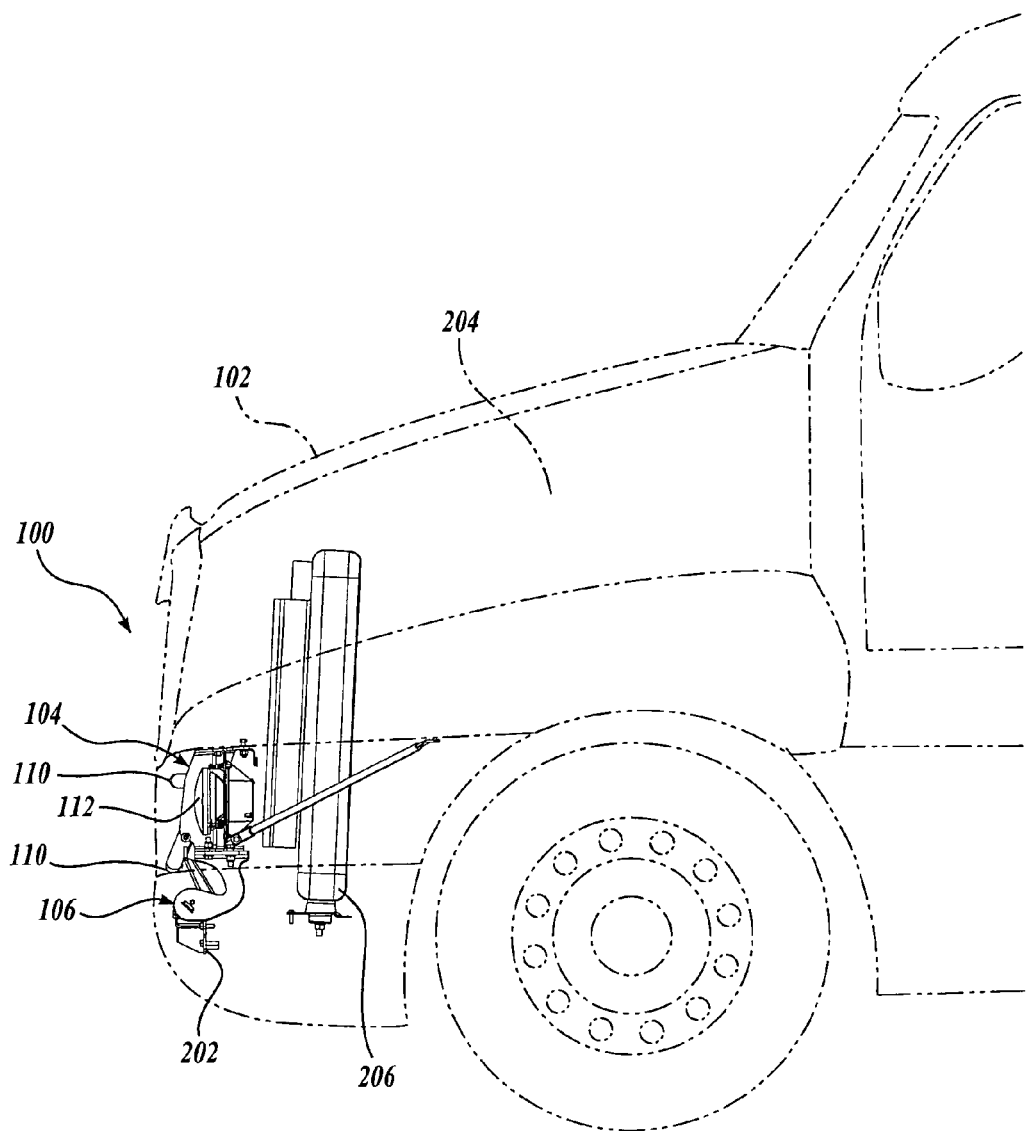
FIG. 4 is a left side elevation view of the hood assembly of FIG. 1 with the hood shown in a closed position and in phantom.
Figure 5:
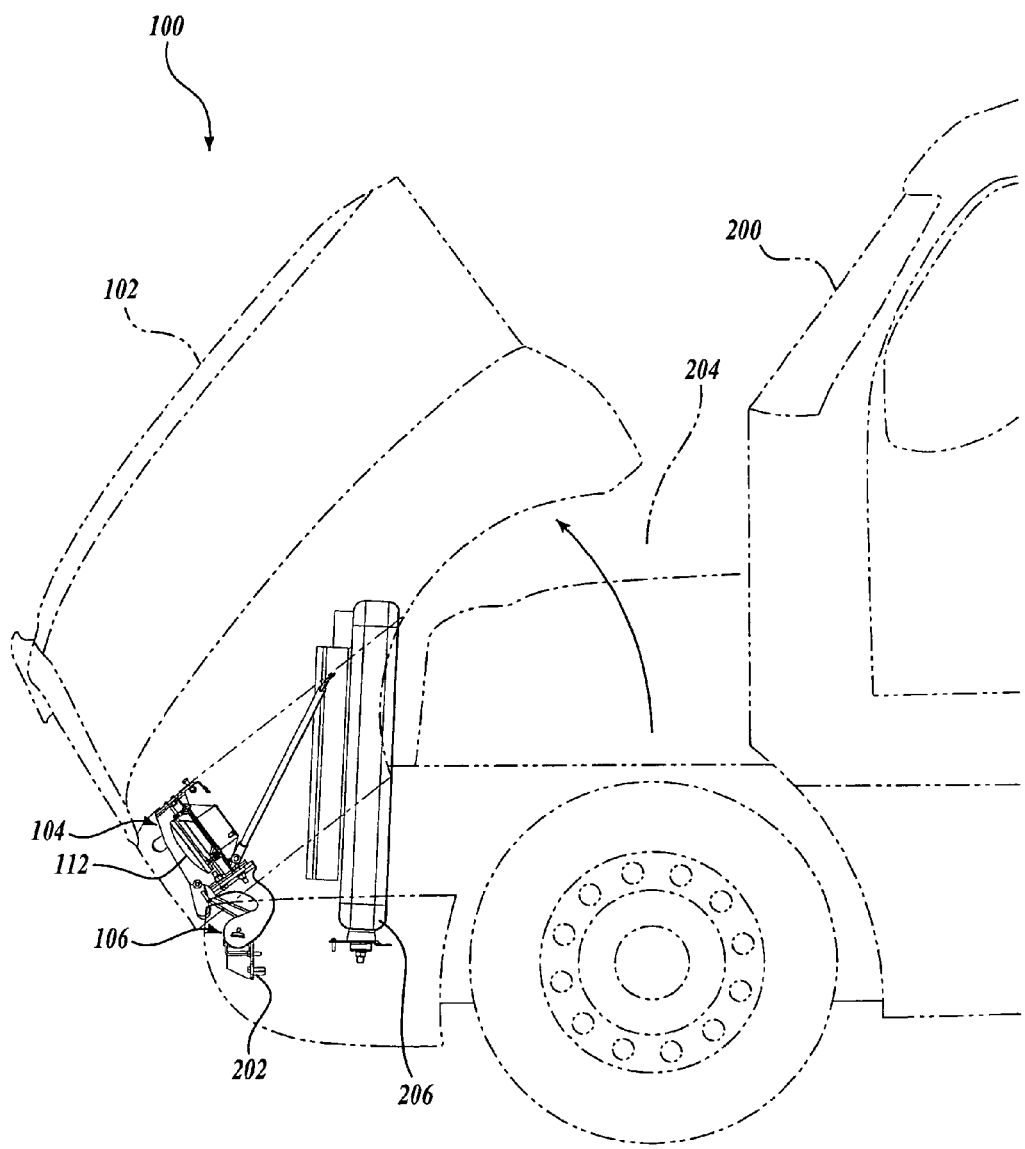
FIG. 5 is a left side elevation view of the hood assembly of FIG. 1 with the hood shown in an open position and in phantom.

One embodiment of a hood assembly 100 formed in accordance with the present invention is shown in FIGS. 1-5. Referring to FIG. 1 and generally described, the hood assembly 100 includes one or more of the following: a hood 102, a hood sub-frame 104, a pivot assembly 106, and a headlight assembly 108. The hood 102 and the headlight assembly 108 are coupled to and supported by the hood sub-frame 104. The hood sub-frame 104 is in turn pivotally coupled to a chassis 202 (See FIG. 4) of the vehicle 200 by the pivot assembly 106. The pivot assembly 106 permits the hood sub-frame 104, and the hood 102 and the headlight assembly 108 which are attached to the hood sub-frame 104, to pivot between an open position as shown in FIG. 5, permitting access to an engine compartment 204 of the vehicle 200, to a closed position as shown in FIG. 4, wherein the engine compartment 204 is at least partially enclosed by the hood 102. The hood sub-frame 104 includes one or more (two shown) cross members 110 which pass in front of and protect a radiator 206 of the vehicle 200. The two cross members 110 also rigidly couple a mounting bracket associated with a left headlight 112 to a mounting bracket associated with a right headlight 114 of the headlight assembly 108 to impede the vibration of the headlights 112 and 114.

In light of the above general description of the hood assembly 100, the structure of the hood assembly 100 will now be described in further detail. Referring to FIG. 2, the headlight assembly 108 includes well known left and right headlights 112 and 114. Each headlight includes a lens 116, a reflector 118 having a light source 120 disposed therein, and a housing 122.

The pivot assembly 106 includes a torsion bar assembly 124 having a torsion bar 125 for applying a predetermined torque to the hood to aid in the opening of the hood, i.e. to counterbalance the weight of the hood during the opening of the hood, and to permit the hood to pivot about a pivot axis 128 defined by the torsion bar assembly 124. The torsion bar assembly 124 is coupled to the chassis 202 (See FIG. 4) of the vehicle by a chassis mounting assembly 126. Coupled at the ends of the torsion bar 125 are a pair of torsion arms 130 of which the torque generated by the torsion bar 125 is applied. Each torsion arm 130 includes a mounting bracket 132 coupled to a distal end of the torsion arm 130. The mounting bracket 132 facilitates the coupling of the hood sub-frame 104 to the pivot assembly 106. Coupled to the chassis mounting assembly 126 is a hood stop 134. The hood stop 134 is adapted to engage the hood sub-frame 104 to impede the rearward movement of the hood sub-frame 104 when impacted by an object such as wildlife. The hood stop 134 extends upward from the chassis mounting assembly 126 so as to extend behind the cross brace assembly 144, and more specifically behind at least one of the cross members 110 of the cross brace assembly 144 such that during a collision with an object, the cross member 110, and thus the entire hood sub-frame 104 and/or the object hitting the hood sub-frame 104, are impeded from deflecting rearward into the radiator, damaging same.

Turning to FIG. 3, the hood sub-frame 104 includes a headlight mounting assembly, which may be subdivided into a left and right headlight mounting assembly 136 and 138, a hood mounting assembly which may be subdivided into a left and right hood mounting assembly 140 and 142, and a cross-brace assembly 144. The left headlight mounting assembly 136 includes a headlight mounting bracket 146 for permitting the left headlight 112 (See FIG. 2) to be mounted to a left side of the hood sub-frame 104. Likewise, the right headlight mounting assembly 138 includes a headlight mounting bracket 148 for permitting the right headlight 114 (See FIG. 2) to be mounted to a right side of the hood sub-frame 104. In one embodiment, the left and right headlight mounting assemblies 136 and 138 are adapted to entirely support the left and right headlights and support the headlights free of any structural attachment to the hood.

The left hood mounting assembly 140 includes a hood mounting bracket 150 for permitting the hood 102 (See FIG. 2) to be mounted to a left side of the hood sub-frame 104. Likewise, the right hood mounting assembly 142 includes a hood mounting bracket 152 for permitting the hood 102 (See FIG. 2) to be mounted to the hood sub-frame 104.

The cross-brace assembly 144 includes the pair of radiator protective members or cross members 110 coupled to the hood sub-frame 104. The cross members 110 pass between and are coupled to the left and right side of the hood sub-frame 104. More specifically, the cross members 110 in the illustrated embodiment pass between and are coupled to the left and right headlight mounting brackets 146 and 148, tying the left and right headlight mounting brackets 146 and 148 to one another, which has the effect, among others, of reducing the vibration of the headlights. In the illustrated embodiment, the cross members 110 are formed by material having a substantially round cross-sectional profile, one suitable example being steel pipe.

Turning to FIG. 4, the cross members 110 are oriented to pass in front of the radiator 206 of the vehicle. By passing in front of the radiator, i.e. forward of the radiator in reference to the normal direction of travel of the vehicle and elevation wise, between a top and a bottom of the radiator, the cross members 110 protect the radiator from impact damage. Accordingly, in one embodiment, the cross members 110 are made from an impact absorbing material, one suitable example being a metal, such as steel. Referring now to FIG. 3, in one embodiment, the left and right headlight mounting assemblies 136 and 138, left and right hood mounting assemblies 140 and 142, and the cross brace assembly 144 are each integrally and non-removably coupled to one another, and formed from an impact absorbing material, one example being steel.

Referring to FIG. 2, in light of the above description of the components of the hood assembly 100, the operation of the hood assembly 100 will be described. During one method of assembly, the chassis mounting assembly 126 of the pivot assembly 106 is rigidly coupled to the chassis 202 (See FIG. 4) of the vehicle. A pair of mounting brackets 154 and 156 (See FIG. 3) of the hood sub-frame 104 are then coupled to the mounting brackets 132 located at the distal ends of the torsion arms 130 of the pivot assembly 106. The headlights 112 and 114 are coupled to the left and right headlight mounting brackets 146 and 148. The hood 102 (See FIG. 1) is coupled to the left and right hood mounting bracket 150 and 152.

Assembled as described, the hood 102 is rigidly coupled to the hood sub-frame 104, thereby providing support and rigidity to the hood 102. Inasmuch as the headlights 112 and 114 are rigidly coupled to the hood sub-frame 104, the hood 102, hood sub-frame 104, and headlights 112 and 114 are all rigidly coupled to one another and move as an integral unit. The pivot assembly 106 permits the hood 102, hood sub-frame 104, and headlights 112 and 114 to rotate as a unit forwardly about a forward bottom leading edge of the hood 102 from a closed position to an open position. More specifically, the hood 102, hood sub-frame 104, and headlights 112 and 114 pivot about the pivot axis 128 of the pivot assembly 106 as the torsion arms 130 coupled to the hood sub-frame 104 rotate. Thus, it is apparent that the hood-sub frame 104 and its attached components are moveably coupled to the chassis of the vehicle, and more specifically, rotatingly coupled to the chassis of the vehicle. The illustrated embodiment of hood-sub frame 104 may support the hood 102 during use, tie the left and right headlights 112 and 114 together during use and to the chassis of the vehicle, and/or protect the radiator from impact damage via the cross members 110 blocking presence in front of the radiator. Further, the headlights 112 and 114 may be completely supported by the hood sub-frame 104, free of structural attachment to the hood 102.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A hood sub-frame adapted to be coupled to a vehicle having a hood moveable between an open position and a closed position comprising:

(a) a left headlight mounting assembly for permitting a headlight to be mounted to a left side of the hood sub-frame;

(b) a right headlight mounting assembly for permitting a headlight to be mounted to a right side of the hood sub-frame;
(c) a hood mounting assembly for coupling the hood sub-frame to the hood such that the hood sub-frame moves with the hood when the hood is coupled to the hood mounting assembly and moved between the open and closed positions;
(d) a cross brace assembly passing between and coupled to the left side of the hood sub-frame and the right side of the hood sub-frame; and
(e) a pivot assembly coupled to the hood sub-frame, the pivot assembly adapted to be couple to a chassis of the vehicle such that the hood sub-frame is pivotable between a first position and a second position to move the hood between the open and closed positions.

2. The hood sub-frame of claim 1, wherein the cross brace assembly is coupled to and extends between the left and right headlight mounting assemblies.

3. The hood sub-frame of claim 1, wherein the cross brace assembly is formed from a metal.

4. The hood sub-frame of claim 1, wherein the pivot assembly includes a stop disposed behind the cross brace assembly for impeding rearward movement of the cross brace assembly.

5. The hood sub-frame of claim 1, wherein the cross brace assembly includes a radiator protective member coupled to and extending between the left and right headlight mounting assemblies.

6. The hood sub-frame of claim 1, wherein the left and right headlight mounting assemblies, hood mounting assembly, and the cross brace assembly are each integrally and non-removably coupled to one another.

7. The hood sub-frame of claim 6, wherein the left and right headlight mounting assemblies, hood mounting assembly, and the cross brace assembly are all made of a metal.

8. The hood sub-frame of claim 1, wherein the left headlight mounting assembly is adapted to support the headlight substantially free of direct structural attachment to the hood when the headlight is mounted to the left headlight mounting assembly.

9. A hood assembly for a vehicle having a hood comprising:
(a) a hood sub-frame comprising:
(i) a left headlight mounting assembly;
(ii) a right headlight mounting assembly;
(iii) a cross brace assembly passing between and coupling the left headlight mounting assembly to the right headlight mounting assembly;
(iv) a hood mounting assembly adapted to be coupled to the hood such that the hood is at least partially supported by the hood mounting assembly and moves with the hood sub-frame; and
(b) a pivot assembly coupled to the hood sub-frame, the pivot assembly adapted to be coupled to a chassis of the vehicle such that the hood sub-frame is pivotable between a first position and a second position to move the hood between an open position and a closed position.

10. The hood assembly of claim 9, wherein the cross brace assembly includes a radiator protective member coupled to and extending between the left and right headlight mounting assemblies.

11. The hood assembly of claim 9, wherein the left and right headlight mounting assemblies, hood mounting assembly, and the cross brace assembly are each integrally and non-removably coupled to one another.

12. The hood assembly of claim 11, wherein the left and right headlight mounting assemblies, hood mounting assembly, and the cross brace assembly are all made of a metal.

13. The hood assembly of claim 9, wherein the pivot assembly includes a stop disposed behind the cross brace assembly for impeding rearward movement of the cross brace assembly.

14. The hood assembly of claim 9, wherein the left headlight mounting assembly is adapted to support a headlight substantially free of direct structural attachment to the hood when the headlight is mounted to the left headlight mounting assembly.

15. A hood assembly adapted to be coupled to a vehicle having a radiator comprising:
(a) a hood moveable between open and closed positions;
(b) a hood sub-frame comprising:
(i) a left headlight mounting assembly;
(ii) a right headlight mounting assembly;
(iii) a cross brace assembly having a radiator protection member passing between and coupling the left headlight mounting assembly to the right headlight mounting assembly; and
(iv) a hood mounting assembly coupled to the hood such that the hood moves with the hood sub-frame; and
(c) a pivot assembly coupled to the hood sub-frame, the pivot assembly adapted to be coupled to a chassis of the vehicle such that the hood sub-frame is pivotal between a first position and a second position to move the hood between the open position and the closed position;
(d) wherein when the hood assembly is coupled to the vehicle and the hood is in the closed position, the radiator protection member passes in front of the radiator.

16. The hood assembly of claim 15, wherein the cross brace assembly is formed from a metal.

17. The hood assembly of claim 15, wherein the left and right headlight mounting assemblies, hood mounting assembly, and the cross brace assembly are each integrally and non-removably coupled to one another.

18. The hood assembly of claim 17, wherein the left and right headlight mounting assemblies, hood mounting assembly, and the cross brace assembly are all made of a metal.

19. The hood assembly of claim 15, wherein the radiator includes a top surface disposed at a first elevation and a bottom surface disposed at a second elevation, wherein when the hood is coupled to the vehicle and the hood is in the closed position, the radiator protection member passes in front of the radiator at a third elevation located between the first and second elevations.

20. The hood assembly of claim 19, wherein the cross brace assembly includes an additional radiator protection member which couples the left headlight mounting assembly to the right headlight mounting assembly, and wherein when the hood is coupled to the vehicle and the hood is in the closed position, the radiator protection member passes in front of the radiator at a fourth elevation located between the first and second elevations.

21. The hood assembly of claim 15, wherein the pivot assembly includes a stop disposed behind the radiator protection member to impede rearward movement of the radiator protection member.

22. The hood assembly of claim 15, further including a headlight mounted to the left headlight mounting assembly and not to the hood such that the headlight is supported by the hood sub-frame and not the hood.

* * * * *